(12) United States Patent
    Falko

(10) Patent No.: US 9,069,593 B2
(45) Date of Patent: Jun. 30, 2015

(54) SYSTEMS AND METHODS FOR DELETION OF UNTRACKED DATASTORE PATHS

(75) Inventor: Andrey Falko, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 280 days.

(21) Appl. No.: 13/211,087

(22) Filed: Aug. 16, 2011

(65) Prior Publication Data

US 2012/0331462 A1    Dec. 27, 2012

Related U.S. Application Data

(60) Provisional application No. 61/500,221, filed on Jun. 23, 2011.

(51) Int. Cl.
    *G06F 9/455* (2006.01)
(52) U.S. Cl.
    CPC .. *G06F 9/45533* (2013.01); *G06F 2009/45562* (2013.01); *Y02B 60/146* (2013.01)
(58) Field of Classification Search
    CPC .......... G06F 2009/45562; G06F 9/445; G06F 9/45533; G06F 9/50; G06F 3/0647; G06F 3/067; G06F 3/0605; G06F 3/0659
    USPC .............. 718/1, 102, 103; 707/716, 731, 831, 707/E17.012, E17.004, 999.01; 711/100, 711/111, 112, 161, 162, 165, 154
    See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |

(Continued)

*Primary Examiner* — Meng An
*Assistant Examiner* — Abu Ghaffari
(74) *Attorney, Agent, or Firm* — Dergosits & Noah LLP; Todd A. Noah

(57) ABSTRACT

In an embodiment, first and second lists of virtual machine datastore paths are obtained. The first list includes datastore paths on a datastore. The second list includes datastore paths that are associated with existing virtual machines. The first and second lists are compared and non-matching datastore paths are deleted from the datastore, thereby freeing up disk space on the datastore.

12 Claims, 9 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,127,471 B1 * | 10/2006 | Wilson ........................ 358/1.15 |
| 7,340,411 B2 | 3/2008 | Cook |
| 7,346,682 B2 * | 3/2008 | Basani et al. ................. 709/224 |
| 7,401,094 B1 | 7/2008 | Kesler |
| 7,620,655 B2 | 11/2009 | Larsson |
| 7,698,160 B2 | 4/2010 | Beaven et al. |
| 7,933,870 B1 * | 4/2011 | Webster ........................ 707/638 |
| 8,010,663 B2 | 8/2011 | Firminger et al. |
| 8,078,653 B1 * | 12/2011 | Bisson et al. ................. 707/829 |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0134178 A1 * | 6/2008 | Fitzgerald et al. ................. 718/1 |
| 2008/0201366 A1 * | 8/2008 | Devarakonda et al. ... 707/103 Y |
| 2009/0063415 A1 | 3/2009 | Chatfield et al. |
| 2009/0217265 A1 * | 8/2009 | Ishikawa ........................ 718/1 |
| 2010/0070725 A1 * | 3/2010 | Prahlad et al. ................. 711/162 |
| 2010/0083251 A1 * | 4/2010 | McCrory et al. ................. 718/1 |
| 2010/0088328 A1 * | 4/2010 | Joshi et al. ..................... 707/758 |
| 2010/0235831 A1 * | 9/2010 | Dittmer ............................ 718/1 |
| 2010/0235832 A1 * | 9/2010 | Rajagopal et al. ................. 718/1 |
| 2012/0311257 A1 * | 12/2012 | Berman et al. ................. 711/115 |

* cited by examiner

SYSTEMS AND METHODS FOR DELETION OF UNTRACKED DATASTORE PATHS

CLAIM OF PRIORITY

This application claims the benefit of U.S. Provisional Patent Application 61/500,221, entitled SYSTEM AND METHODS FOR DELETION OF UNTRACKED DATASTORE PATHS, by Andrey Falko, filed Jun. 23, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to utility operations on storage media.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data storage, especially when viewed in the aggregate, can be very expensive. There is a cost to purchase a storage device and a cost to maintain the storage device. For example, a data center is a facility used to house storage systems. A data center provides a central place where people and businesses can store information. Adding storage capacity to a data center can be expensive because in addition to purchasing the actual storage devices, there may also be added administration costs, real estate costs, and cooling and power requirements for the additional storage devices.

Accordingly, it is desirable to provide new and improved techniques to make efficient use of existing storage.

BRIEF SUMMARY

In an embodiment, first and second lists of virtual machine datastore paths are obtained. The first list includes datastore paths on a datastore. The second list includes datastore paths that are associated with existing virtual machines. The first and second lists are compared and non-matching datastore paths are deleted from the datastore, thereby freeing up disk space on the datastore.

In an embodiment and by way of example, a method for deleting untracked datastore paths includes obtaining a first list of datastore paths from a datastore and obtaining a second list of datastore paths. The datastore paths of the second list are associated with existing virtual machines, and the datastore paths of the first and second lists identify locations on one or more physical disks of the datastore for storing virtual machine files. The method further includes comparing the first list of datastore paths with the second list of datastore paths, based on the comparison, determining that at least one datastore path listed in the first list is associated with a deleted virtual machine, and deleting the at least one datastore path listed in the first list from the one or more physical disks of the datastore.

While one or more implementations and techniques are described with reference to an embodiment in which deletion of untracked datastore paths is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are provided for deleting unnecessary datastore paths, thereby providing storage space for other data.

Figure 1:
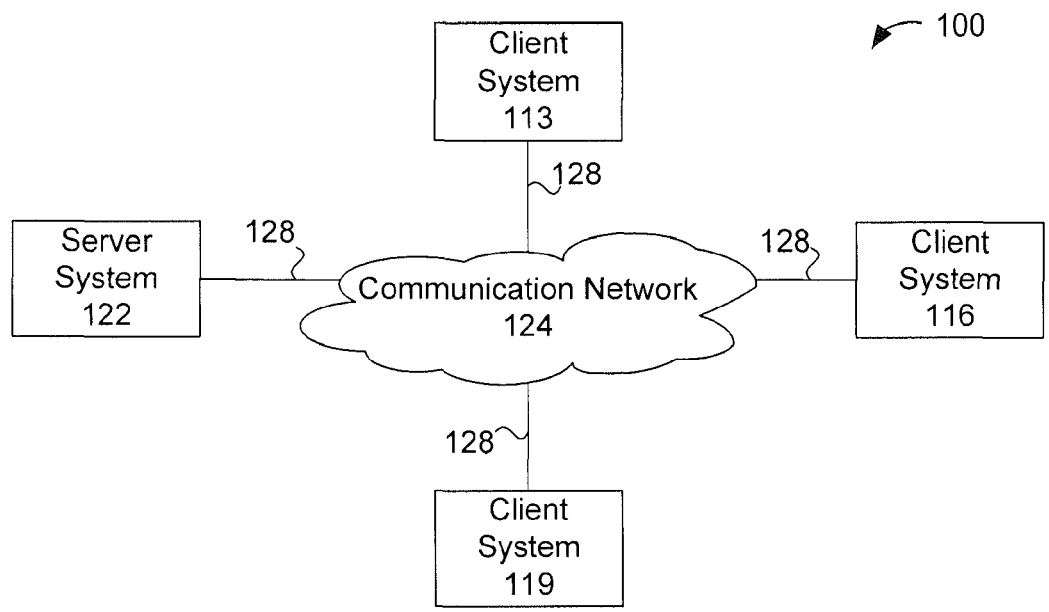
FIG. 1 illustrates a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
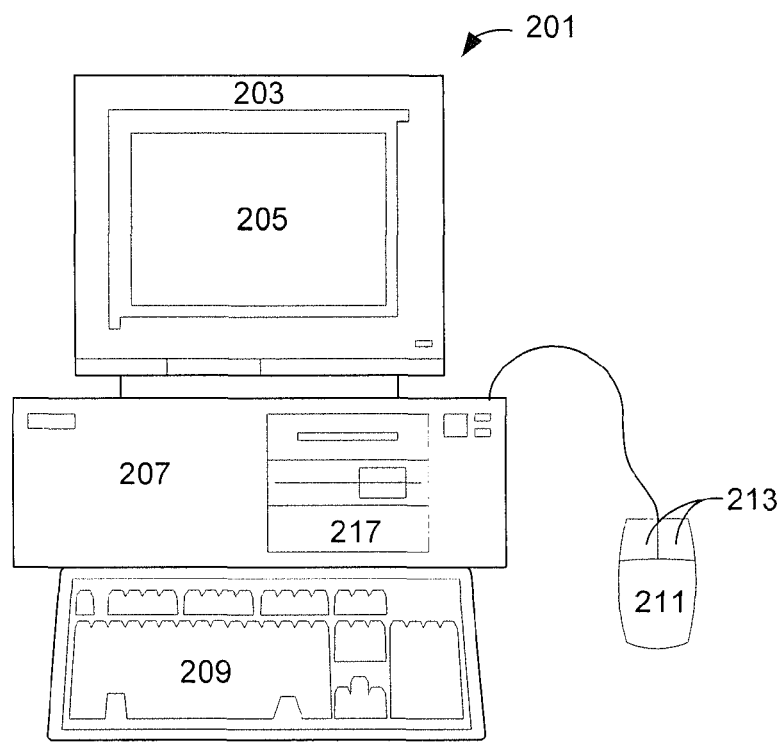
FIG. 2 illustrates a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
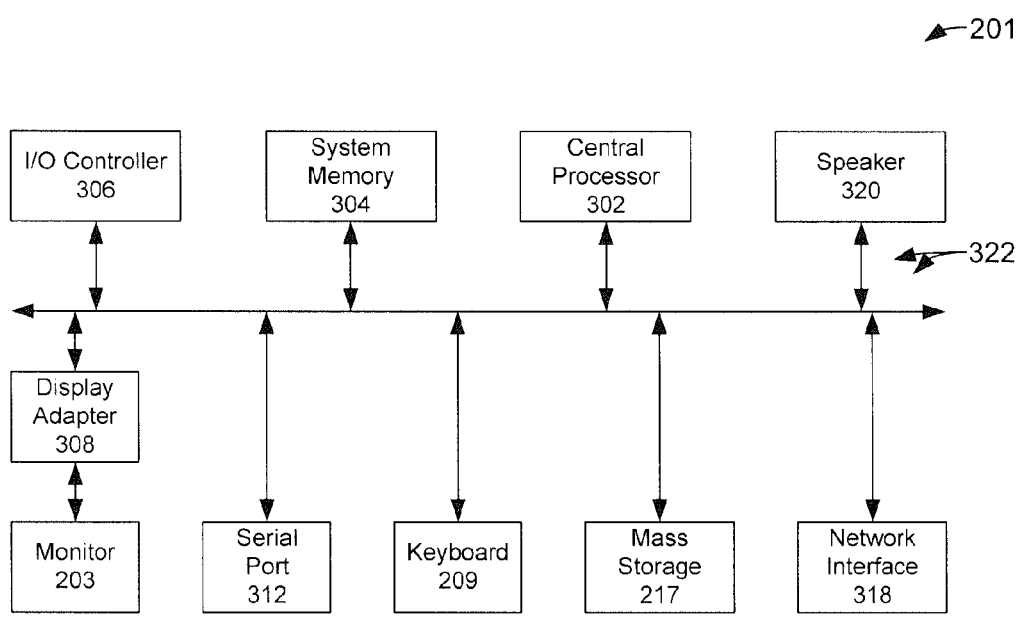
FIG. 3 illustrates a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
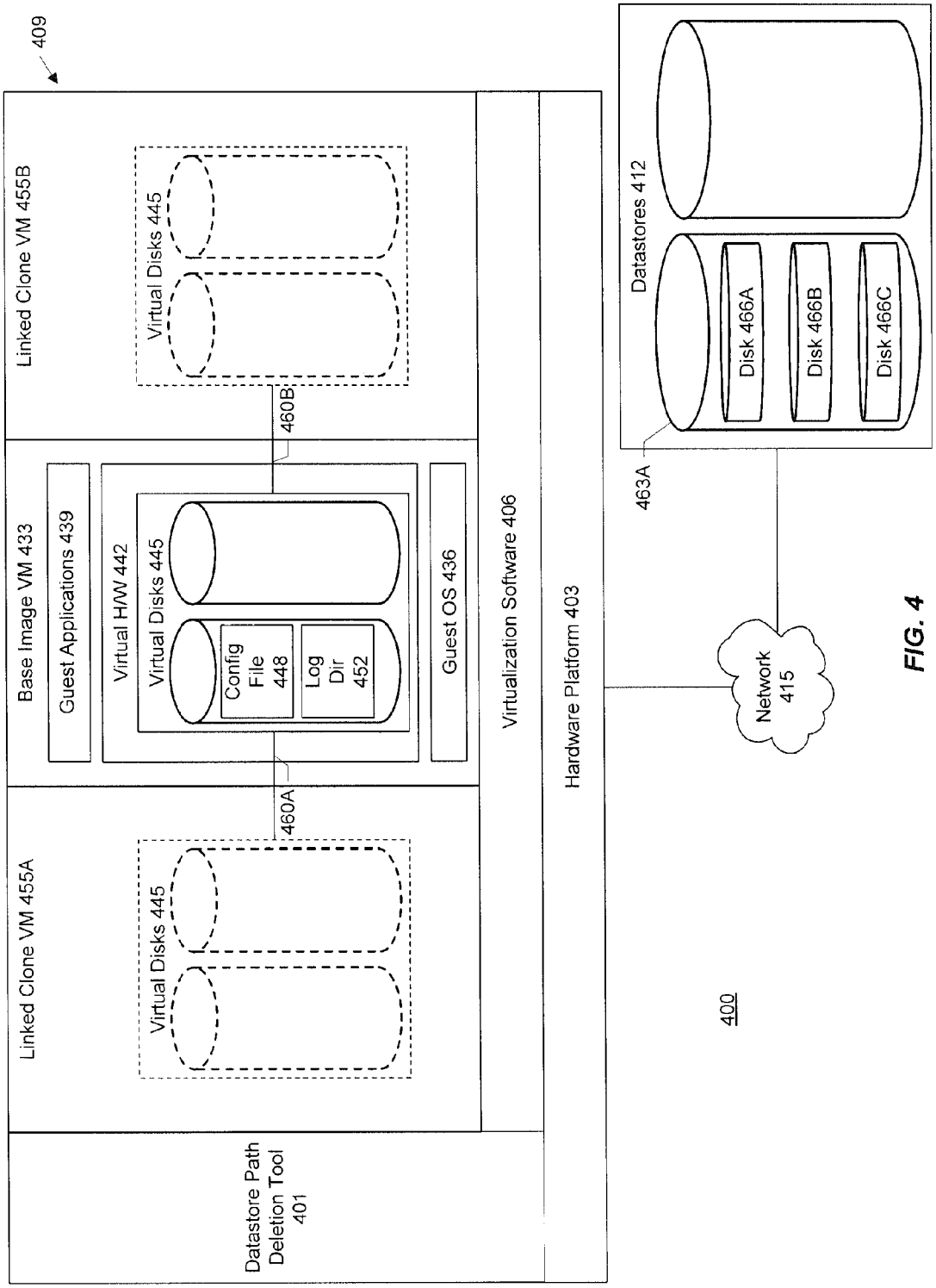
FIG. 4 illustrates a block diagram of an environment in which a datastore path deletion tool may be used in an embodiment.

FIG. 4 shows a block diagram of an exemplary environment 400 in which a specific embodiment of the invention may be implemented. This environment includes a datastore path deletion tool 401, a physical hardware platform 403, virtualization software 406 running on the hardware platform, and one or more virtual machines 409 running on the hardware platform via the virtualization software. As shown in FIG. 4, the hardware platform is connected to one or more datastores 412 via a network 415.

In brief, the datastore path deletion tool is a program which helps to make efficient use of existing storage media. In an embodiment, the tool frees up disk space on one or more datastores through utility operations that delete unnecessary datastore paths associated with deleted virtual machines. These datastore paths may be referred to as untracked datastore paths. In a specific implementation, the path deletion tool includes an algorithm or software instructions that finds and deletes an untracked datastore path.

In a specific implementation, the path deletion tool is implemented as a program that is separate from the virtualization software. For example, when the virtualization software is installed, the path deletion tool may not be installed. In another specific implementation, the path deletion tool is a code component or module of the virtualization software. The tool maybe implemented as an add-in, plug-in, script, macro, library, or extension program. The tool may reside on the same physical machine as the virtual machine or the tool may be remote from the physical machine on which the virtual machine is running. The tool may be referred to as a clean-up utility, disk clean-up utility, or a disk clean-up tool. The path deletion tool is further discussed later in this patent application.

The network may be as shown in FIG. 1. The hardware platform may be a general purpose computing system having one or more components such as that shown in FIGS. 2-3. For example, the hardware platform may include a user interface, one or more processors, a network interface, mass storage, and memory. Alternatively, some embodiments may not include the user interface or the user interface may not be connected directly to the hardware platform. For example, user interaction may be automated or occur remotely in connection with data center administration.

In a virtual machine environment, the hardware platform may be referred to as a host, host machine, or host computer. The host uses the virtualization software to run the virtual machines. A specific example of a virtualization software product is vSphere, provided by VMware of Palo Alto, Calif. Generally, virtualization is an abstraction layer that allows multiple virtual environments to run in isolation, side-by-side on the same physical machine. A virtual machine (VM) is a software implementation of a machine (i.e., a computer) that executes programs like a physical machine. In other words, the virtual machine is a software abstraction of a physical computer system that is installed as a "guest" on the "host" hardware platform.

More specifically, a virtual machine 433 can include a guest operating system 436, guest applications 439 running on the guest operating system, and virtual hardware 442 which represents a hardware state of the virtual machine. Virtual hardware refers to the hardware resources allocated to the virtual machine and is mapped to the hardware platform. The virtual hardware may include one or more virtual disks 445, a configuration file 448, and a log directory 452. Although not shown, the virtual hardware may further include one or more virtual processors, virtual system memory, and various virtual devices for which the guest operating system includes corresponding drivers.

The virtual disks may be stored as files on the host computer, on a remote storage device, or both, and appear to the guest operating system as standard disk drives. The configuration file is a file (e.g., .vmx file) that includes the virtual machine configuration. In particular, the configuration file can specify which virtual devices, such as disks and memory, are present in the virtual machine and how they are mapped to host files and devices. Typically, the configuration file is created when the virtual machine is created. The configuration file can be used to identify and run a specific virtual machine.

The log directory includes log files that may be automatically created by the virtualization software and which record various activities, events, and transactions. Some specific examples of log directories created by the vSphere product include "/var/log/vmkernel" for logging activities related to the virtual machines, "/var/log/secure" for recording connections that require authentication, "/var/log/messages" for general logging of messages that can be used to troubleshoot the virtual machine, and so forth. In particular, the log directory or file "/vmfs/volumes/<DS>/<VM>/vmware.log" or "/vmfs/volumes/<DS>/<VM>/vmware-*.log" includes virtual machine power events, system crashes, virtual hardware changes, and clone information. This directory may be the same directory as the virtual machine's configuration files.

With virtualization, each of the guest applications and the guest operating system can behave as if they were running on their own real computer. Once the guest application is installed within the virtual machine, the guest operating system can retrieve files from the virtual disks as if they were stored by a conventional application installation mechanism.

Some virtual machine software products provide for "cloning" of a virtual machine to create one or more other virtual machines, i.e., duplicate virtual machines. The source virtual machine from which a clone is made may be referred to as a base image or parent virtual machine. The duplicate of the parent may be referred to as a clone or child virtual machine. Cloning allows making one or more copies of a same virtual machine from a single installation and configuration process. This helps to save time in setting up guest operating systems, configurations, preferences, and applications for each virtual machine. Cloning can be used to deploy identical virtual machines.

Cloning can be especially useful during software testing. In particular, a virtual machine can be configured with a complete development environment and then cloned repeatedly as a baseline configuration for software testing. As other examples, an information technology (IT) department can clone a virtual machine for each employee, with a suite of preconfigured office applications. A teacher can clone a virtual machine for each student, with all the lessons and labs required for the term. Generally, changes made to a clone do not affect the parent virtual machine and changes made to the parent virtual machine do not appear in a clone. Generally, a clone's Media Access Control address (MAC address) and universally unique identifier (UUID) are different from the parent virtual machine.

There can be two types of clones including a full clone and a linked clone. A full clone is an independent copy of a virtual machine that shares nothing with the parent virtual machine after the cloning operation. Ongoing operation of a full clone is separate from the parent virtual machine. Generally, full clones take longer to create than linked clones. For example, creating a full clone can take several minutes if the files involved are large. However, a full clone may offer better performance than a linked clone because the full clone does not share virtual disks with the parent virtual machine.

A linked clone is a copy of a virtual machine that shares virtual disks with the parent or base image virtual machine in an ongoing manner. As shown in the example of FIG. 4, virtual machine 433 is a base image or parent virtual machine from which linked clone virtual machines 455A and 455B were created. These linked clones have access to the base image. In particular, these linked clones share 460A and 460B virtual disks 445 with base image or parent virtual machine 433 as indicated by the broken lines of the virtual disks of the linked clones.

A linked clone can be made from a snapshot of the parent. Linked clones help to conserve disk space and allow multiple virtual machines to use the same software installation. Linked clones can be created relatively swiftly. For example, a support team can reproduce a bug in a virtual machine and an engineer can quickly make a linked clone of that virtual machine to fix the bug.

A datastore, such as a datastore 463A, includes one or more mass storage devices, storage media, or physical disks, such as physical disks 466A, 466B, and 466C for storing virtual machine files. For example, a base image file of base image virtual machine 433 may be stored in the datastore. The datastore may be referred to as a storage location. The storage location can be a virtual machine file system (VMFS) volume, a network file system (NFS) volume, a directory on network attached storage, a local file system path, or combinations of these. There can be any number of datastores.

More particularly, in an embodiment, every virtual machine in an environment (e.g., vSphere environment) has an associated datastore path. These datastore paths (or folders) contain all virtual disk files, log files, and the like associated with the virtual machine. As discussed, there can be two kinds of virtual machines: base images and linked clones. Linked clones share the virtual disks of base images and write any disk changes to a "delta file." This delta file is written to the linked clone's datastore path. Sometimes a base image will be deleted, but there will be linked clones that are still using the virtual disk of the base image. If the virtual disks owned by the base image are also used by a linked clone, the datastore path will not be deleted, but the base image will still be deleted. This can cause an "untracked datastore path" because no virtual machine maps to the path. This path will not be deleted automatically and will take up expensive disk space. Thus, it is desirable to provide an automated way to clean up these untracked datastore paths.

Figure 5:
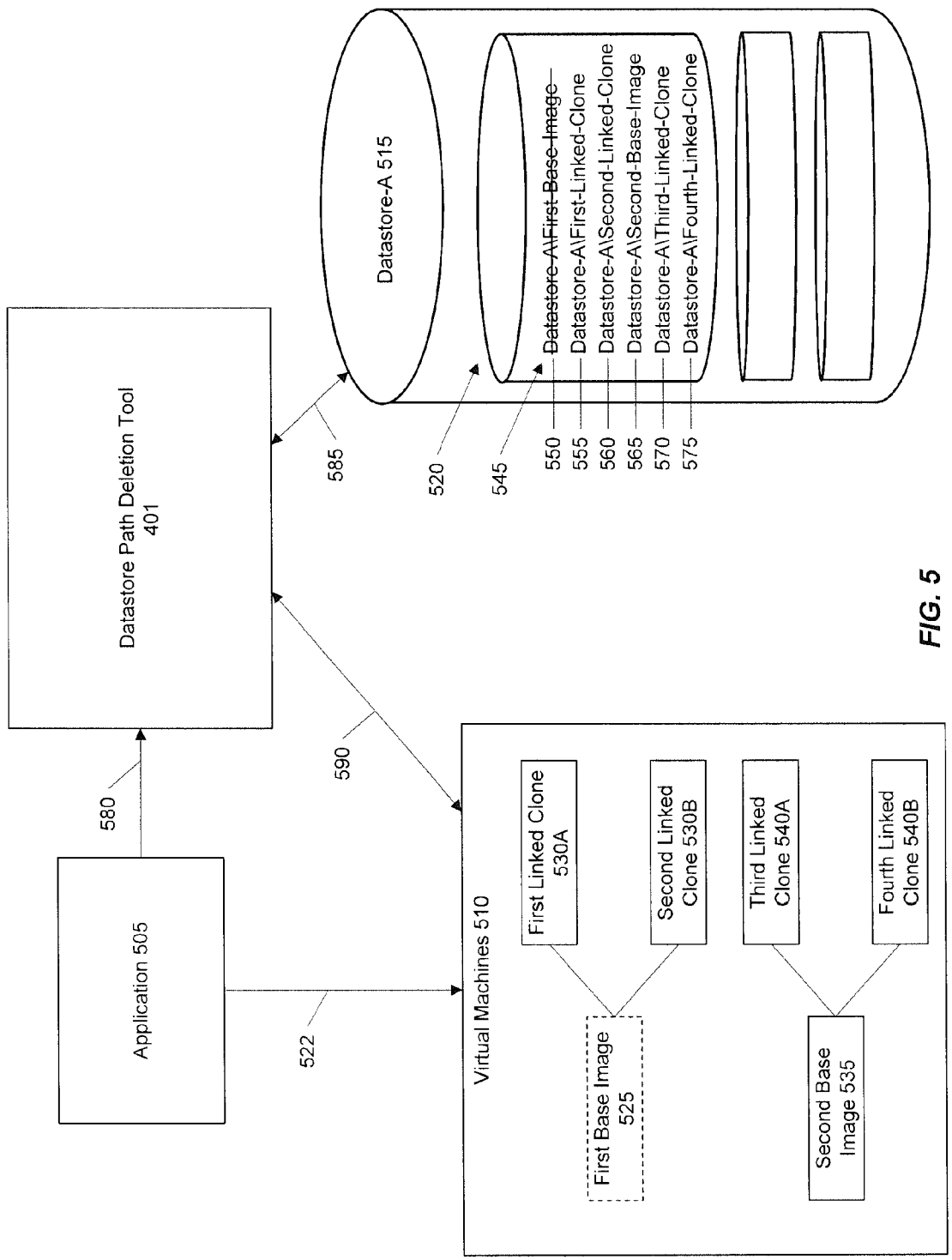
FIG. 5 illustrates a block diagram of the operation of the datastore path deletion tool in an embodiment.
Figure 6:
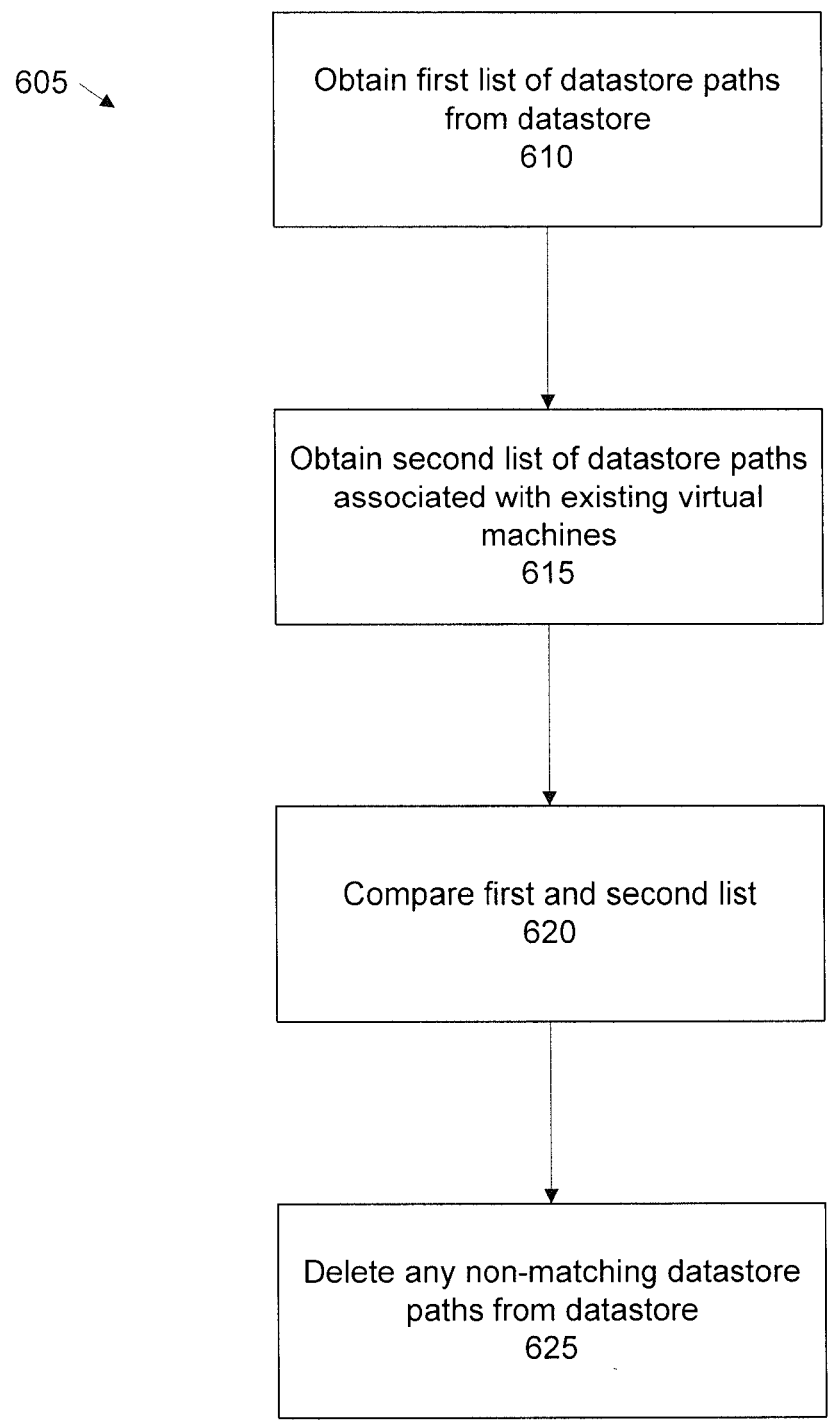
FIG. 6 illustrates a flow diagram of a technique for deleting datastore paths in an embodiment.

FIGS. 5-6 show a block diagram and flow, respectively, of a specific embodiment of the datastore path deletion tool operation. As shown in FIG. 5, there is an application program 505, path deletion tool 401, a set of virtual machines 510, and a datastore 515 having physical disks 520.

In this specific embodiment, the application program communicates 522 with the virtualization software to create the virtual machines. As shown in FIG. 5, there can be a first base image virtual machine 525 from which linked clones 530A and 530B were created. There can be a second base image virtual machine 535 from which linked clones 540A and 540B were created.

Datastore paths 545 on the physical disks of the datastore identify the locations on the physical disk in which the various virtual machine files (e.g., virtual disk files, log files, delta files, and so forth) are stored. FIG. 4 shows datastores 412 as being remote from hardware platform 403. It should be appreciated, however, that other configurations are possible. For example, a datastore may be local to the hardware platform. A datastore path may have the form "[<datastore>]<path>," where <datastore> is the datastore name, and <path> is a slash-delimited path from the root of the datastore.

For example, a first datastore path 550 maps to virtual machine files associated with first base image 525 (e.g., "FirstBaseImage.vmx," or "FirstBaseImageConfig.vmx"). A second datastore path 555 maps to virtual machine files associated with first linked clone 530A (e.g., first linked clone delta files). A third datastore path 560 maps to virtual machine files associated with second linked clone 530B (e.g., second linked clone delta files). A fourth datastore path 565 maps to virtual machine files associated with second base image 535 (e.g., "SecondBaseImage.vmx," or "SecondBaseImageConfig.vmx"). A fifth datastore path 570 maps to virtual machine files associated with third linked clone 540A (e.g., third linked clone delta files). A sixth datastore path 575 maps to virtual machine files associated with fourth linked clone 540B (e.g., fourth linked clone delta files).

In the example shown in FIG. 5, first base image virtual machine 525 has been deleted as indicated by the broken lines. Thus, the existing virtual machines include first linked clone virtual machine 530A, second linked clone virtual machine 530B, second base image virtual machine 535, third linked clone virtual machine 540A, and fourth linked clone virtual machine 540B.

A base image virtual machine may be deleted for any number of reasons. For example, there may be a newer base image virtual machine that the organization is using. So, the older base image virtual machine may be deleted. As a specific example, the first base image virtual machine may be provisioned with a development environment having a first version of an application to be tested. Typically, provisioning refers to a process of creating a functioning virtual machine by assigning resources such as CPU, memory, and virtual hardware and then deploying a system image. Linked clones 530A and 530B are cloned from the first base image. Test procedures or routines (e.g., automated, manual, or both) may be performed within the linked clone virtual machines. In this specific embodiment, the base image is treated as "read-only." Any changes made within the linked clone virtual machine during the testing are saved in a delta file.

Based on the testing, changes (e.g., bug fixes) may be made to the application and the second base image virtual machine may be provisioned with a second version of the application to be tested. Linked clones 540A and 540B are cloned from the second base image. The second version of the application (e.g., the newer or later version of the application) is then tested within the linked clone virtual machines 540A and 540B.

Thus, there may no longer be a need for the first base image because there is a newer base image that is being used, i.e., the second base image. So, the first base image will be deleted. It should be appreciated that some organizations will keep or retain some old base images in case the need arises to examine the old base images such as for reviewing prior application code versions. For example, an organization may keep the three most-recent base images. Base images older than the three-most recent base images may be deleted in order to free up disk space.

However, as discussed above, a base image may be deleted but there may be existing linked clones of the deleted base image that are still using the virtual disk of the deleted base image. In an embodiment, the virtualization software does not automatically delete the base image's datastore paths because the linked clones may be relying on the base image's datastore paths. For example, if a test run of an application inside a linked clone freezes, it may be desirable to preserve the linked clone to investigate why the test froze. As another example, when there is a test that runs far longer than expected, the linked clone may out-live the base image. As another example, deletions of linked clones may fail for extraneous reasons or systematic failures, causing a delay in the deletion of linked clones. Further, in some cases, even if a linked clone is deleted the virtualization software will not delete the datastore paths owned by or associated with the deleted link clone.

The datastore paths associated with the deleted base image or deleted linked clone can occupy disk space on the physical disks. There can be virtual disks that do not map to any virtual machines. Such a datastore path may be referred to as an "untracked datastore path" because no virtual machine maps to the path. The untracked datastore path occupies disk space on the physical disks that could otherwise be reused for other data.

The amount of disk space occupied can be significant, e.g., about 12 gigabytes to about 15 gigabytes, but can vary greatly depending on factors such as the size, complexity, and configurations. Freeing up disk space has many advantages. For example, less hardware (e.g., storage devices) needs to be purchased which in turn lowers power and energy costs. Cooling costs can be lowered because there is no additional hardware to cool. Likewise, there can be a reduction in data center size or square footage which can mean a reduction in land use and real estate or property costs such as costs associated with purchasing, leasing, renting, or maintaining a data center.

In a specific implementation, path deletion tool 401 receives an input 580 to delete untracked datastore paths. In a specific implementation, the input is trigged when application 505 starts up. Triggering the path deletion tool upon application 505 start up helps to ensure that there is no cloning in progress. If a cloning is in progress it can be difficult to extract the log configuration file which can be used to identify which datastore path is being used. Specifically, a datastore path for the in-progress clone may be created which the tool (if being used) may find. The datastore path may not appear to be used by anything when in fact it is (or will be) used by the in-progress clone. Deleting the datastore path associated with the in-progress clone is undesirable because the clone will fail if the directory is removed out from under it.

However, it should be appreciated that the input may be triggered at anytime such as when application 505 is shut down, when application 505 is running (e.g., after the application starts up and before the application shuts down), in response to user input or on-demand (e.g., user clicks a button to run the path deletion tool), when or after the base image is deleted, and so forth. The path deletion tool can check whether there is a cloning in process. In a specific implementation, if there is a cloning in progress, the path deletion tool may automatically pause operating until after the cloning is completed or the tool may abort operation. The tool may generate an alert, notification, or message (e.g., popup dialog box) to inform the user that a cloning is in progress and that the tool operation has been paused or aborted. In a specific implementation, when the tool determines or detects that the cloning is completed, the tool can resume operation. In another specific implementation, the tool is adapted to operate while a cloning is in progress and is adapted to not delete datastore paths associated with in-progress clones.

In brief, in a specific implementation, the tool identifies 585 a first list or set of datastore paths in one or more datastores. The tool identifies 590 the existing virtual machines and a second list or set of datastore paths associated with the existing virtual machines. The tool compares the two sets of datastore paths and identifies any non-matching or non-corresponding datastore paths in the first set.

A datastore path in the first set, but not in the second set can indicate that the datastore path is associated with a virtual machine (e.g., base image or linked clone) that has been deleted, recycled, or removed, i.e., the base image or linked clone no longer exists. The tool can delete the datastore path from the physical disks of the datastore and thus free up space. For example, as shown in FIG. 5, the path deletion tool has identified first datastore path 550 as being a non-matching or non-corresponding datastore path. That is, the first datastore path is listed in the first list, but is not listed or is omitted from the second list. Thus, the tool may determine that first datastore path 550 is associated with a deleted virtual machine (e.g., first base image virtual machine 525). Thus, the tool has deleted the first datastore path from the disk as indicated by the strikethrough of the first datastore path in FIG. 5.

More particularly, FIG. 6 shows a flow diagram 605 of a specific technique for deleting untracked datastore paths via the path deletion tool 401 (FIGS. 4-5). Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a step 610, the path deletion tool obtains a first list of datastore paths from one or more datastores. In other words, software instructions can obtain a list of all datastore paths from the environment. For example, the path deletion tool may scan the datastore to retrieve the datastore paths from the datastore. Alternatively, the tool may log in remotely to a host (e.g., a VMware ESX host) that contains the datastore and list the directory contents of it to get the paths, or login to the native storage host (it could be an NFS host, Fiber channel host, and so forth) and retrieve the directory contents from there. In a specific implementation, the first list is stored in a hash mapping of the path name to datastore that it is on.

Generally, a hash table or hash map is a data structure that uses a hash function to map identifying values, sometimes referred to as keys (e.g., a person's name), to their associated values (e.g., the person's telephone number). Thus, a hash table can implement an associative array. The hash function can be used to transform the key into the index (the hash) of an array element (the slot or bucket) where the corresponding value is to be sought. One benefit of hash tables is that a hash table can be more efficient than search trees or other types of table lookup structures.

In this specific implementation, the datastore paths found in the datastore are input into a hash function which returns an index or index value corresponding to the inputted datastore path. As an example, Table A below shows a first hash map to store the datastore paths found in the datastore.

TABLE A

| Index | Element |
|---|---|
| 00 | datastore path B |
| 01 | datastore path D |
| 02 | datastore path A |
| 03 | datastore path Q |
| 04 | datastore path R |
| 05 | datastore path C |

As shown in Table A above, the hash map includes an index column and an element column. As discussed, the hash function takes as input the datastore path and returns a specific value which may be referred to as an index. The element column lists the datastore paths. The index column lists the corresponding index values produced by the hash function upon input of the datastore paths.

In this specific implementation, the path deletion tool also creates an empty hash map (or second hash map) which will store the untracked paths to be deleted. In other words, in this specific implementation, software instructions create an empty hash mapping of path name to datastore which will contain a list of untracked paths. Table B below shows an example of an empty hash map.

TABLE B

| Index | Element |
|---|---|
| 00 | null |
| 01 | null |

TABLE B-continued

| Index | Element |
|---|---|
| 02 | null |
| 03 | null |
| 04 | null |
| 05 | null |

In step 615, the path deletion tool obtains a second list of datastore paths where each datastore path of the second list is associated with an existing virtual machine. More specifically, in a specific implementation, software instructions obtain a list of all virtual machines in the environment as "VirtualMachine" objects. For each virtual machine in the environment, software instructions obtain the "VirtualMachineConfigInfo," which may be used to discover the "log directory" used by the virtual machine. This log directory is the virtual machine's datastore path. Using this information, a mapping of virtual machine datastore paths to datastores can be created. In a specific implementation, the second list is stored in a hash map.

Table C below shows an example of a hash map (or third hash map) of datastore paths associated with existing virtual machines.

TABLE C

| Index | Element |
|---|---|
| 00 | datastore path B |
| 01 | datastore path D |
| 02 |  |
| 03 | datastore path Q |
| 04 |  |
| 05 | datastore path C |

In this specific implementation, the Table C above is populated by obtaining, for each existing virtual machine, a datastore path associated with the existing virtual machine and inputting the datastore path into the hash function which outputs a corresponding index value.

Thus, as shown in Table C above, "datastore path B" having a corresponding index of "00" is associated with a first existing virtual machine, "datastore path D" having a corresponding index of "01" is associated with a second existing virtual machine, "datastore path Q" having a corresponding index of "03" is associated with a third existing virtual machine, and "datastore path C" having a corresponding index of "05" is associated with a fourth existing virtual machine. Indexes "02" and "04," however, are empty indicating that datastore paths corresponding to the indices "02" and "04" are associated with non-existing virtual machines.

In step 620, the path deletion tool compares the first list of datastore paths in the datastore (step 610) with the second list of datastore paths associated with the existing virtual machines (step 615). Any non-matching datastore paths are deleted from the datastore (step 625). In other words, if a datastore path is listed in the first list, but is not listed in the second list, i.e., the datastore path is omitted from the second list, the datastore path is deleted, removed, cleaned, recycled, dropped, or erased from the datastore.

More particularly, in a specific implementation, the path deletion tool compares the first hash map of datastore paths from the datastore (Table A above) with the third hash map of datastore paths associated with existing virtual machines (Table C above). Non-matching datastore paths are added to the second hash map or empty hash map (Table B above). For example, in comparing Tables A and C, datastore paths A and R, having corresponding indices "02" and "04," respectively, are added to the second hash map. Table D below shows the addition of datastore paths A and R to the second hash map.

TABLE D

| Index | Element |
|---|---|
| 00 | null |
| 01 | null |
| 02 | datastore path A |
| 03 | null |
| 04 | datastore path R |
| 05 | null |

The datastore path deletion tool can look up indices "02" and "04" in the second hash map and delete from the datastore the corresponding datastore paths A and R, respectively, e.g., delete datastore paths A and R from the physical disks.

Thus, in a specific implementation, software instructions go through all paths found in the list of all datastore paths from the environment and check if the path exists in the mapping of virtual machine datastore paths to datastores. When checking, it may be useful to ensure that comparisons are made on the same datastore. If the path does not exist in the mapping of virtual machine datastore paths, then add to the empty hash mapping. In a final step, for all of the non-matching paths found, issue the appropriate command to delete the paths.

In another specific implementation, a method includes identifying one or more datastore paths for one or more corresponding virtual machines in a virtual machine environment, identifying the one or more corresponding virtual machines, identifying a log directory for each of the one or more corresponding virtual machines, determining if any of the one or more datastore paths matches at least one of the log directory for each of the one or more corresponding virtual machines, and, if there is no match, then deleting the non-matching paths.

In a specific implementation, Java's native HashMap object is used. It should be appreciated, however, that any suitable hash function or hashing methodology or technique may be used. It should also be appreciated that a hash function may be used in combination with an algorithm to help prevent collision, i.e., the case where two inputs hash to the same output. Some specific examples of hashing techniques include additive hashing, multiplicative hashing, rotative hashing, string hashing, cryptographic hashing, geometric hashing, bloom filters, chaining (e.g., separate chaining or separate chaining with list heads), closed hashing, coalesced hashing, Robin Hood hashing, cuckoo hashing, hopscotch hashing, stable hashing, consistent hashing, extendible hashing, Rabin-Karp string search algorithm, and Pearson hashing—just to name a few examples. Other implementations may instead or additionally use other techniques besides hashing in order to identify datastore paths that should be deleted from the datastore, such as search trees (e.g., AVL trees, Red-black trees, splay trees, Tango trees, ternary search trees, B trees, B+ trees, or van Emde Boas trees).

In a specific implementation, the datastore path deletion tool is used in conjunction with software testing via base image and linked clone virtual machines. However, this is merely one example where the tool may be used. It should be appreciated that the tool may be used in any scenario, environment, or application in which it is desirable to delete untracked datastore paths such as that resulting from a deleted base image virtual machine.

Figure 7:
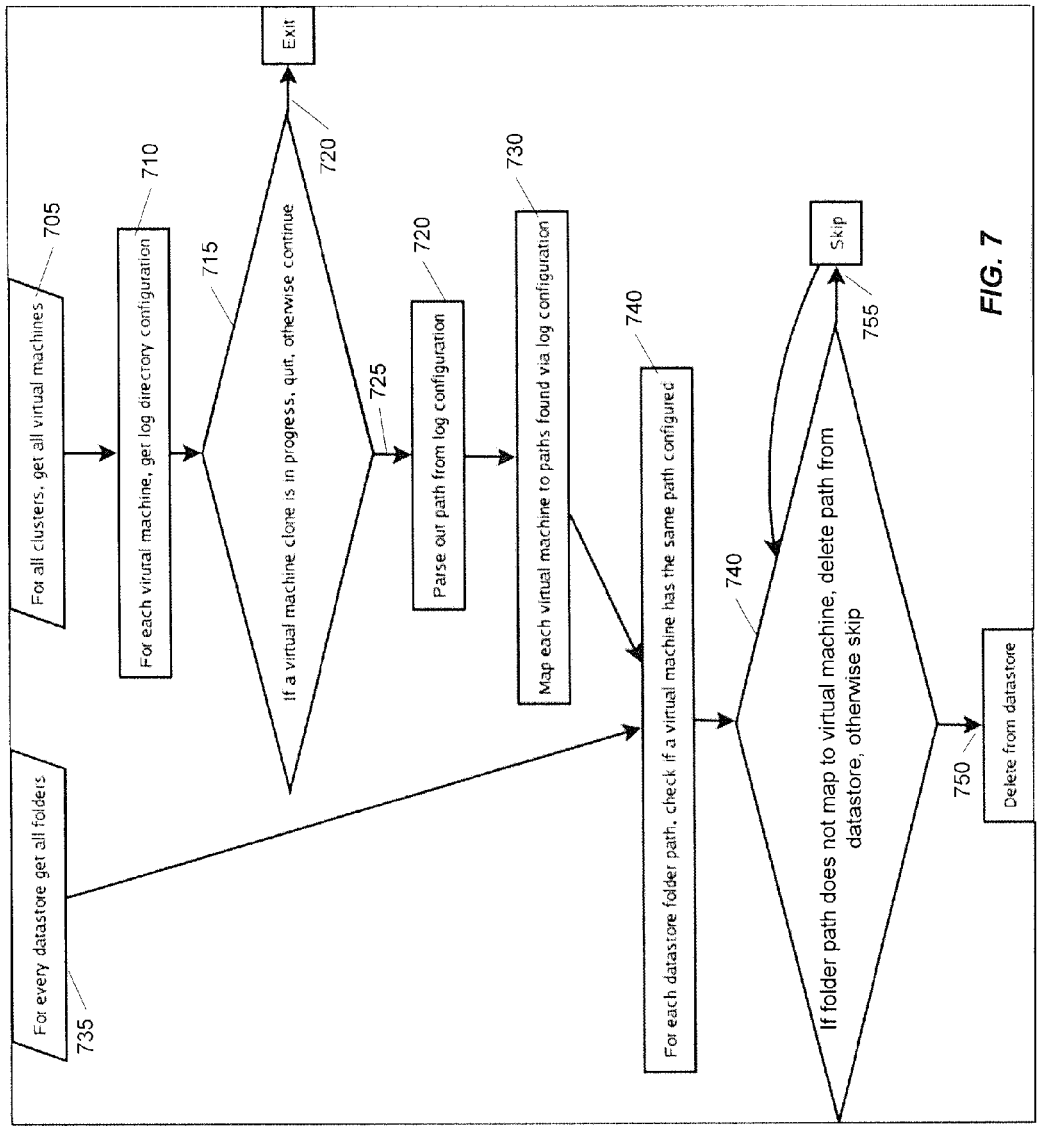
FIG. 7 illustrates another flow diagram of a technique for deleting datastore paths in an embodiment.

FIG. 7 shows another flow diagram 702 of a technique for deleting untracked datastore paths. Table E gives detail for a specific flow shown in FIG. 7.

TABLE E

| Step | Description |
|---|---|
| 705 | For all clusters, get all virtual machines. For example, retrieve a list of virtual machines VM 1, VM 2, and VM 3. |
| 710 | For each virtual machine, get log directory configuration. For example, retrieve log directory configuration file 1 for VM 1, log directory configuration file 2 for VM 2, and log directory configuration file 3 for VM 3. |
| 715 | If a virtual machine clone is in progress, quit (720), otherwise continue (725). |
| 720 | Parse out path from log directory configuration file. For example, parse log directory configuration file 1 to obtain path 1, parse log directory configuration file 2 to obtain path 2, and parse log directory configuration file 3 to obtain path 3. |
| 730 | Map each virtual machine to one or more paths found via log directory configuration file. For example, map VM 1 to path 1, map VM 2 to path 2, and map VM 3 to path 3. |
| 735 | For every datastore, get all folders. For example, retrieve from the datastore path 1, path 2, path 3, and path 4. |
| 740 | For each datastore folder path, check if a virtual machine has the same path configured. For example, compare datastore folder paths (735) with virtual machine datastore paths found via log directory configuration file (730). |
| 745 | If folder path does not map to virtual machine, delete path from datastore (750), otherwise skip (755) For example, delete datastore path 4 from datastore because no virtual machine maps to path 4. |

Figure 8:
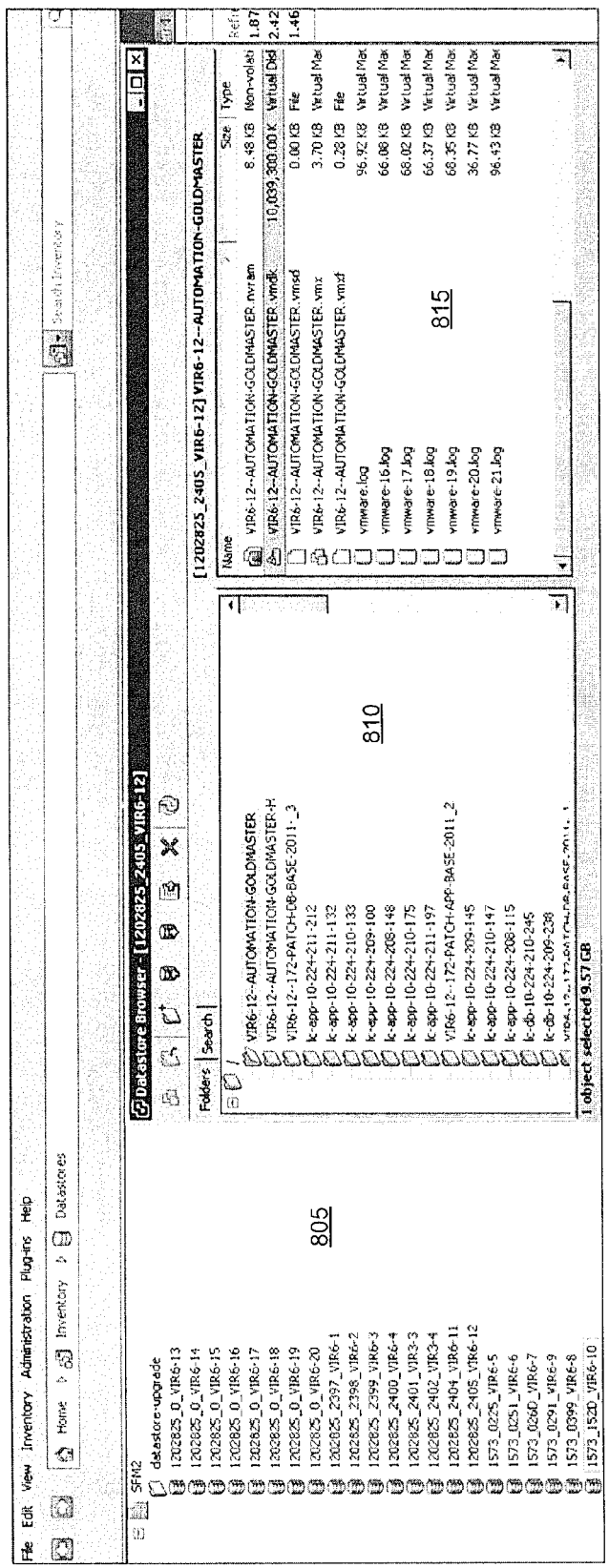
FIG. 8 illustrates a screenshot of a list of datastores and datastore paths or folders.

FIG. 8 is a screenshot showing an exemplary list of datastores 805 and a list of datastore paths or folders 810 which contain virtual machine files 815 associated with a virtual machine.

Figure 9:
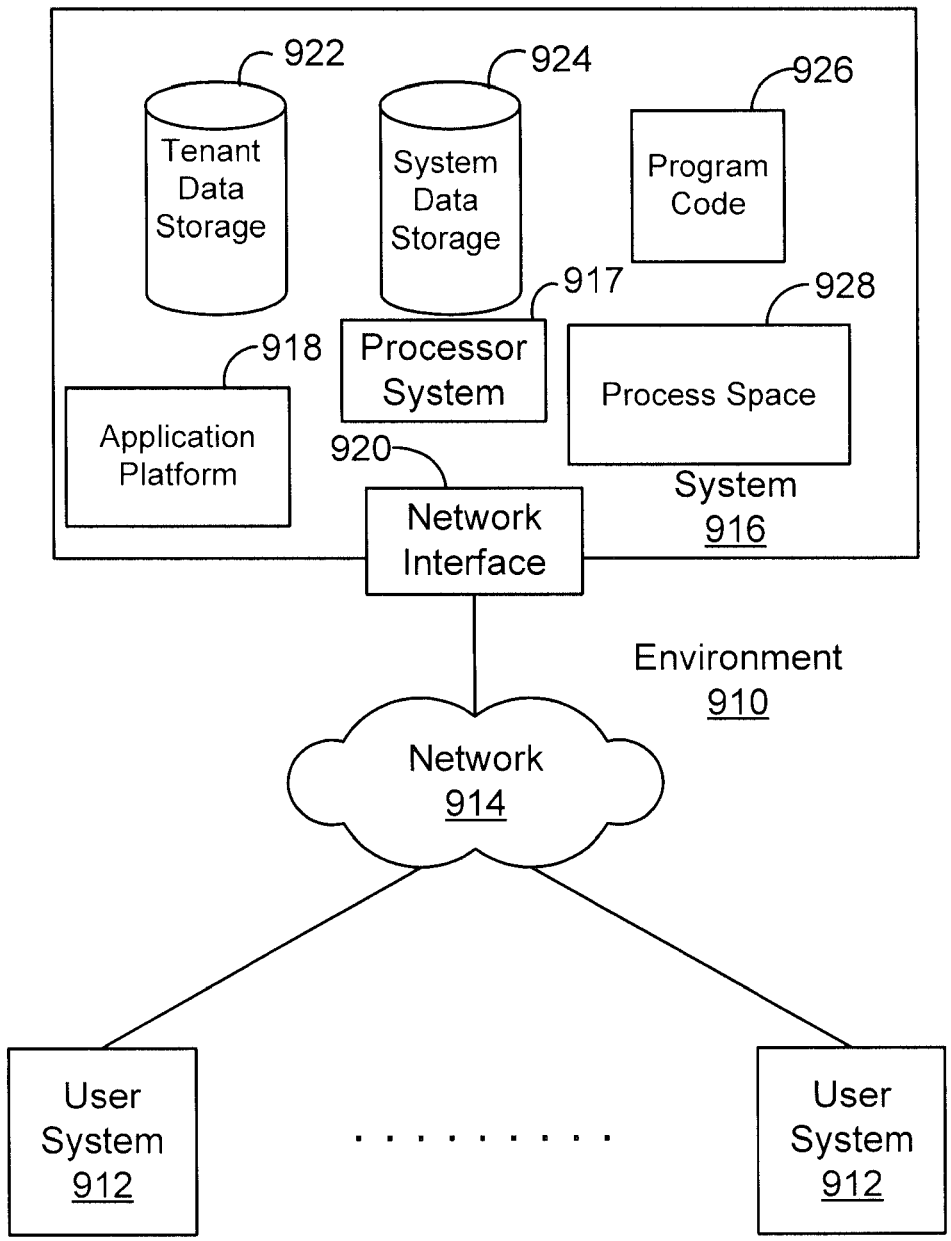
FIG. 9 illustrates a block diagram of an example of an environment wherein an on-demand database service implementing an embodiment of a datastore path deletion tool might be used.

FIG. 9 illustrates a block diagram of an environment 910 wherein an on-demand database service implementing an embodiment of a system and method for deletion of untracked datastore paths might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content.

With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application (s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
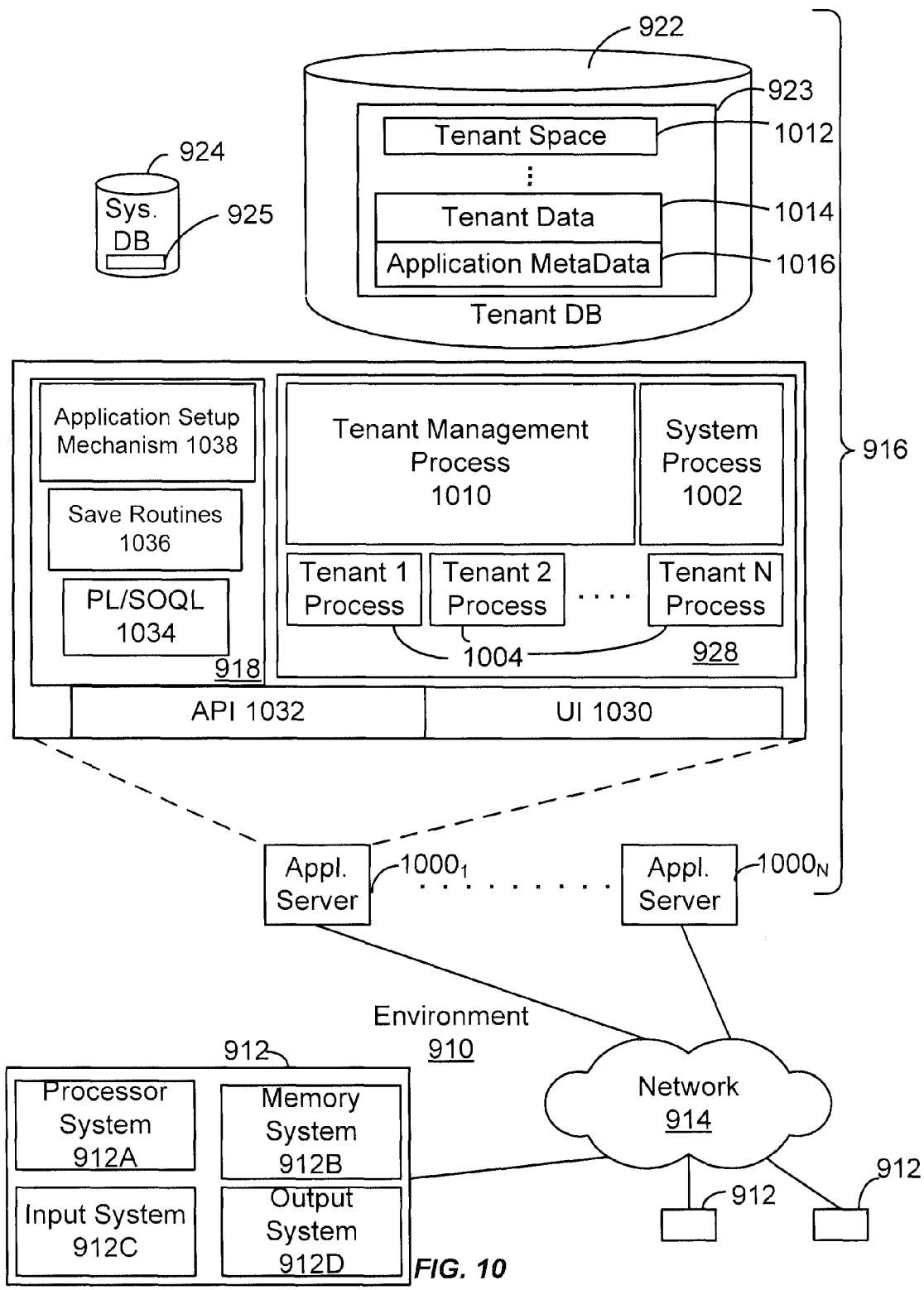
FIG. 10 illustrates a block diagram of an embodiment of elements of FIG. 9 and various possible interconnections between these elements.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes, Invocations to applications may be detected by one or more system processes, which manages retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for deleting datastore paths corresponding to deleted virtual machines on a host computer, the method comprising:
    obtaining a first set of datastore paths from a datastore, the first set of datastore paths corresponding to a first set of virtual machines;
    obtaining a second set of datastore paths, the second set of datastore paths corresponding to all existing virtual machines on the host computer, wherein the first and second sets of datastore paths identify locations on one or more physical disks of the datastore;
    comparing the first set of datastore paths with the second list set of datastore paths; and deleting, based on the comparison, datastore paths in the first set of datastore paths that are not contained in the second set of datastore paths from the one or more physical disks of the datastore, the deleted datastore paths representing mappings to files corresponding to one or more deleted virtual machines, and the deleted one or more virtual machines having been base image virtual machines from which linked clone virtual machines were created prior to deletion.

2. The method of claim 1 wherein the existing virtual machines include a base image virtual machine and a linked clone virtual machine.

3. The method of claim 1 wherein the obtaining the second set of datastore paths comprises:
 obtaining a plurality of configuration files for the existing virtual machines; and
 obtaining from the configuration files log directories used by the existing virtual machines, wherein the log directories identify the datastore paths of the second set of datastore paths.

4. A computer program product comprising computer readable program code for deleting datastore paths corresponding to deleted virtual machines on a host computer, the program code to be executed by one or more processors when retrieved from a non-transitory machine-readable medium, the program code including instructions to:
 obtain a first set of datastore paths from a datastore, the first set of datastore paths corresponding to a first set of virtual machines;
 obtain a second set of datastore paths, the second set of datastore paths corresponding to all existing virtual machines on the host computer, wherein the first and second sets of datastore paths identify locations on one or more physical disks of the datastore;
 compare the first set of datastore paths with the second set of datastore paths; and
 delete, based on the comparison, datastore paths in the first set of datastore paths that are not contained in the second set of datastore paths from the one or more physical disks of the datastore, the deleted datastore paths representing mappings to files corresponding to one or more deleted virtual machines, and the deleted one or more virtual machines having been base image virtual machines from which linked clone virtual machines were created prior to deletion.

5. The computer program product of claim 4 wherein the existing virtual machines include a base image virtual machine and a linked clone virtual machine.

6. The computer program product of claim 4 wherein the instructions to obtain the second set of datastore paths comprise instructions to:
 obtain configuration files for the existing virtual machines; and
 obtain from the configuration files log directories used by the existing virtual machines, wherein the log directories identify the datastore paths of the second set of datastore paths.

7. An apparatus comprising:
 a processor; and
 one or more stored sequences of instructions for deleting datastore paths corresponding to deleted virtual machines on a host computer which, when executed by the processor, cause the processor to:
 obtain a first set of datastore paths from a datastore, the first set of datastore paths corresponding to a first set of virtual machines;
 obtain a second set of datastore paths, the second set of datastore paths corresponding to all existing virtual machines on the host computer, wherein the first and second sets of datastore paths identify locations on one or more physical disks of the datastore;
 compare the first set of datastore paths with the second set of datastore paths; and
 delete, based on the comparison, datastore paths in the first set of datastore paths that are not contained in the second set of datastore paths from the one or more physical disks of the datastore, the deleted datastore paths representing mappings to a files corresponding to one or more deleted virtual machines, and the deleted one or more virtual machines having been base image virtual machines from which linked clone virtual machines were created prior to deletion.

8. The apparatus of claim 7 wherein the existing virtual machines include a base image virtual machine and a linked clone virtual machine.

9. The apparatus of claim 7 wherein the one or more stored sequences of instructions to obtain the second set of datastore paths comprise instructions to:
 obtain configuration files for the existing virtual machines; and
 obtain from the configuration files log directories used by the existing virtual machines, wherein the log directories identify the datastore paths of the second set of datastore paths.

10. A system for deleting datastore paths corresponding to deleted virtual machines on a host computer, the system comprising:
 a processor-based application, which when executed on a computer, causes the processor to:
 obtain a first set of datastore paths from a datastore, the first set of datastore paths corresponding to a first set of virtual machines;
 obtain a second set of datastore paths, the second set of datastore paths corresponding to all existing virtual machines on the host computer, wherein the first and second sets of datastore paths identify locations on one or more physical disks of the datastore;
 compare the first set of datastore paths with the second set of datastore paths; and
 delete, based on the comparison, datastore paths in the first set of datastore paths that are not contained in the second set of datastore paths from the one or more physical disks of the datastore, the deleted datastore paths representing mappings to files corresponding to one or more deleted virtual machines, and the deleted one or more virtual machines having been base image virtual machines from which linked clone virtual machines were created prior to deletion.

11. The system of claim 10 wherein the existing virtual machines include a base image virtual machine and a linked clone virtual machine.

12. The system of claim 10 wherein the processor-based application, when executed, further causes the processor to:
 obtain configuration files for the existing virtual machines; and
 obtain from the configuration files log directories used by the existing virtual machines, wherein the log directories identify the datastore paths of the second set of datastore paths.

* * * * *